(12) United States Patent
Braun et al.

(10) Patent No.: US 12,174,431 B2
(45) Date of Patent: Dec. 24, 2024

(54) METHODS AND COMPOSITIONS FOR THE SURFACE TREATMENT OF FERRULES AND FIBERS FOR IMPROVED BONDING OF OPTICAL FIBES WITHIN FERRULES

(71) Applicant: COMMSCOPE TECHNOLOGIES LLC, Hickory, NC (US)

(72) Inventors: Dennis Marvin Braun, Waconia, MN (US); Matthew Peter Galla, Holly Springs, NC (US); Peter Gottschalk, Maplewood, MN (US); Richard J. Drapeau, Victoria, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 253 days.

(21) Appl. No.: 17/917,875

(22) PCT Filed: Apr. 7, 2021

(86) PCT No.: PCT/US2021/026269
§ 371 (c)(1),
(2) Date: Oct. 7, 2022

(87) PCT Pub. No.: WO2021/207421
PCT Pub. Date: Oct. 14, 2021

(65) Prior Publication Data
US 2023/0152532 A1    May 18, 2023

Related U.S. Application Data

(60) Provisional application No. 63/006,502, filed on Apr. 7, 2020, provisional application No. 63/006,466, filed on Apr. 7, 2020.

(51) Int. Cl.
*G02B 6/38* (2006.01)
*C09J 4/00* (2006.01)
*C09J 11/06* (2006.01)

(52) U.S. Cl.
CPC .............. *G02B 6/3861* (2013.01); *C09J 4/00* (2013.01); *C09J 11/06* (2013.01); *G02B 6/3885* (2013.01); *C09J 2301/408* (2020.08)

(58) Field of Classification Search
None
See application file for complete search history.

(56) References Cited

U.S. PATENT DOCUMENTS 5,790,762 A * 8/1998 Aepli .................. G02B 6/3874
385/139
6,085,004 A 7/2000 Dower et al.
(Continued)

OTHER PUBLICATIONS

International Search Report and Written Opinion of the International Searching Authority for International Patent Application No. PCT/US2021/026269 mailed Jul. 27, 2021, 11 pages.
(Continued)

*Primary Examiner* — Jerry Rahll
(74) *Attorney, Agent, or Firm* — MERCHANT & GOULD P.C.

(57) ABSTRACT

Disclosed herein is a ferrule assembly. The ferrule assembly comprises a ferrule having an inner diameter surface. The ferrule assembly also comprises an adhesion promotor coating composition comprising an amine functionality, a glycidyl functionality, a thiol functionality, an oxirane functionality, or any combination thereof and a radical cure initiator. The ferrule assembly may further comprise an inorganic hydrolysable layer on the inner diameter surface. The ferrule assembly may also further comprise an adhesion promotor coating on the inorganic hydrolysable layer of a composition.

15 Claims, 9 Drawing Sheets

(56) References Cited

U.S. PATENT DOCUMENTS

| | | | |
|---|---|---|---|
| 8,696,215 B1 | 4/2014 | Fewkes et al. | |
| 8,753,021 B1 | 6/2014 | Baca et al. | |
| 8,906,178 B2 | 12/2014 | Burek et al. | |
| 9,039,295 B2 | 5/2015 | Fewkes et al. | |
| 9,086,548 B2 | 7/2015 | DeRosa et al. | |
| 9,128,254 B2 | 9/2015 | Danley et al. | |
| 9,268,101 B2 | 2/2016 | Danley et al. | |
| 9,518,000 B2 | 12/2016 | Sullivan et al. | |
| 9,523,008 B2 | 12/2016 | Malofsky et al. | |
| 9,752,059 B2 | 9/2017 | Malofsky et al. | |
| 9,790,295 B2 | 10/2017 | Sullivan et al. | |
| 2003/0165300 A1 | 9/2003 | Greub et al. | |
| 2006/0008212 A1* | 1/2006 | Wada | G02B 6/3861 |
| | | | 385/80 |
| 2008/0009562 A1 | 1/2008 | Mitachi et al. | |
| 2015/0093080 A1 | 4/2015 | DeRosa et al. | |
| 2015/0098679 A1 | 4/2015 | Fewkes et al. | |
| 2015/0148480 A1 | 5/2015 | Ellison et al. | |
| 2015/0362679 A1 | 12/2015 | Wu | |
| 2016/0363732 A1 | 12/2016 | Zimmel et al. | |
| 2017/0315306 A1 | 11/2017 | Fewkes et al. | |
| 2018/0052286 A1 | 2/2018 | Danley et al. | |
| 2018/0059336 A1 | 3/2018 | Baca et al. | |
| 2018/0067262 A1 | 3/2018 | Larson et al. | |
| 2020/0148922 A1* | 5/2020 | Arai | H01L 23/10 |
| 2022/0282135 A1* | 9/2022 | Kamimura | C09J 5/04 |

OTHER PUBLICATIONS (N,N-Dimethyl-3-Aminopropyl)Trimethoxysilane, Safety Data Sheet SID3547.0, Gelest Inc., 1-8 (2015).

Kenrich Petrochemicals, Inc. Safety Data Sheet according to OSHA Hazard Communication Standard 2012 (29 CFR 1910.1200), Ken-React® KZ® TPP, Kenrich Petrochemicals, Inc, 1-5 (2015).

Kenrich Petrochemicals, Inc. Safety Data Sheet according to OSHA Hazard Communication Standard 2012 (29 CFR 1910.1200), Ken-React® NZ® 97, Kenrich Petrochemicals, Inc, 1-5 (2015).

10-(Phosphonooxy)decyl methacrylate, Safety Data Sheet, Matrix Scientific, 1-4 (2017).

Zirconium(IV) propoxide solution, Safety Data Sheet, Sigma-Aldrich Corporation, 1-9 (2017).

* cited by examiner

METHODS AND COMPOSITIONS FOR THE SURFACE TREATMENT OF FERRULES AND FIBERS FOR IMPROVED BONDING OF OPTICAL FIBES WITHIN FERRULES

CROSS-REFERENCE TO RELATED APPLICATIONS

This application is a National Stage Application of PCT/US2021/026269, filed on Apr. 7, 2021, which claims the benefit of U.S. Patent Application Ser. No. 63/006,466, filed on Apr. 7, 2020, and claims the benefit of U.S. Patent Application Ser. No. 63/006,502, filed on Apr. 7, 2020, the disclosures of which are incorporated herein by reference in their entireties. To the extent appropriate, a claim of priority is made to each of the above disclosed applications.

TECHNICAL FIELD

The present disclosure relates generally to methods and compositions for bonding optical fibers within ferrules used in fiber optic connectors.

BACKGROUND

Fiber optic communication systems are becoming prevalent in part because service providers want to deliver high band width communication capabilities (e.g., data and voice) to customers. Fiber optic communication systems employ a network of fiber optic cables to transmit large volumes of data and voice signals over relatively long distances. Fiber optic connectors are an important part of most fiber optic communication systems. Fiber optic connectors allow optical fibers to be quickly optically connected without requiring a splice. Fiber optic connectors can include single fiber connectors and multi-fiber connectors.

FIG. 1 is an exploded view depicting an example single-fiber optical connector 20 adapted to terminate the end of a fiber optic cable 22. The optical connector 20 includes a ferrule assembly 24 that mounts at a distal end 26 of a connector body 28. A release sleeve 30 for releasing the optical connector 20 from a fiber optic adapter mounts over the connector body 28. The ferrule assembly 24 includes a ferrule 32 and a hub 34 that mounts at a proximal end of the ferrule 32. The ferrule 32 is adapted for supporting an end portion of an optical fiber 36 of the fiber optic cable 22. A spring 38 within the connector body 28 is adapted to bias the ferrule assembly 24 in a distal direction relative to the connector body 28. The optical fiber 36 includes polished end face that located at a distal end 39 of the ferrule 32 when the optical fiber 36 is secured within the ferrule 32. An optical connection between two of the single-fiber optical connectors 20 is typically provided via an intermediate fiber optic adapter having an alignment sleeve for co-axially aligning the ferrules 32 of the optical connectors 20. When two of the optical connectors 20 are coupled together by an intermediate fiber optic adapter, the distal ends 39 of the ferrules 32 oppose and are biased toward one another by the springs 38 of the connectors 20. With the optical connectors 20 connected, the respective optical fibers 36 are coaxially aligned such that the end faces of the optical fibers directly oppose one another. In this way, optical signals can be transmitted from optical fiber 36 to optical fiber 36 through the aligned end faces of the optical fibers 36. The ferrule 32 is commonly made of a ceramic material such as zirconia.

FIG. 2 depicts an example multi-fiber optical connector 50 including a ferrule assembly 52 that mounts within a connector housing 54. The connector housing 54 includes a distal connector body 56 and a proximal connector body 58. A release sleeve 60 for releasing the connector 50 from a fiber optic adapter mounts on the connector housing 54. The ferrule assembly 52 includes a ferrule 62 that mounts at the distal end of the distal connector body 56. The ferrule assembly 52 also includes a ferrule boot 64 that mounts within a proximal end of the ferrule 62 and a pin holder assembly 66 that mounts at the proximal end of the ferrule 62. A spring 67 is provided for biasing the ferrule assembly 52 in a distal direction relative to the connector housing 54. The proximal connector body 58 retains the ferrule assembly 52 and the spring 66 within the connector housing 54. The multi-fiber optic connector 50 is depicted as an MPO connector (multi-fiber push-on connector) and is adapted to be mounted at the end of a multi-fiber optical cable 68. The multi-fiber optical cable 68 includes a plurality of optical fibers 70 having end portions that are bonded within the ferrule 62. The ferrule 62 is commonly made of a polymeric material such as polyphenylene sulfide (PPS) having glass fillers. The ferrule 62 has a distal end face at which polished ends of the optical fibers 70 are located. Two of the multi-fiber optical connectors 50 are typically interconnected through the use of an intermediate fiber optic adapter. When two of the multi-fiber optical connectors 50 are interconnected by a fiber optic adapter, their respective optical fibers are coaxially aligned such that the end faces of the optical fibers directly oppose one another. Therefore, optical signals can be transmitted from optical fiber to optical fiber through the aligned end faces of the optical fibers.

SUMMARY

Adhesives are used for potting an optical fiber in a ferrule. Optical fiber pull-out can occur due to any of: (1) inadequate shear strength of the adhesive; (2) inadequate bonding of the adhesive to the ferrule; and (3) inadequate bonding of the adhesive to the fiber. Oftentimes, fiber pull-out occurs as a result of inadequate bonding of the adhesive to the ferrule. Further, the potting process can be time intensive and thus adds significantly to the cost of manufacturing fiber optic connectors. Aspects of the present disclosure also relate to adhesives, coatings and processing techniques adapted to improve fiber optic connector manufacturing efficiency by reducing adhesive cure times associated with bonding optical fibers to ferrules.

Certain aspects of the present disclosure relate to a ferrule assembly having a coating on the inner surface of the ferrule used to initiate an adhesive cure reaction to reduce curing times associated with fiber-to-ferrule bonding. In certain examples, the coating can include a chemical cure initiator (e.g., an activator) for initiating curing of an adhesive used to bond the optical fiber to the ferrule. In certain examples, the adhesive or the coating can include a radical cure initiator that when used in combination with the chemical cure initiator enables dual curing of the adhesive. In one example, the radical cure initiator can promote activation of the adhesive when the adhesive is exposed to radiant energy (e.g., light, heat, etc.). In certain examples the chemical cure initiator is applied to the fiber. In certain examples the adhesive or coating can include an adhesion promoter that when used in combination with the chemical cure initiator promotes bonding between the fiber and the ferrule. In certain examples the adhesion promotor is applied by vapor deposition.

Certain aspects of the present disclosure include methods for bonding an optical fiber within a fiber opening of a ferrule using an adhesive. In certain examples these methods include bonding an optical fiber within a fiber opening of a ferrule using an adhesive and initiating curing of the adhesive with both a chemical cure initiator and a radical cure initiator. In certain examples the radical cure initiator is activated by UV light.

Certain aspects of the present disclosure relate to methods of adhering an optical fiber in a ferrule where a chemical cure initiator is applied between the optical fiber and the ferrule. The chemical cure initiator initiates the curing of an adhesive composition containing a monomeric precursor of a methylene malonate polymer and a UV radical cure initiator.

Certain aspects of the present disclosure relate to methods of adhering an optical fiber in a ferrule with an adhesive composition containing a monomeric precursor of a methylene malonate polymer that is polymerized by a chemical initiator and a radical cure initiator. In certain examples an adhesion promotor is also applied to the applied at an interface between the optical fiber and the ferrule to further accelerate and strengthen the bond between the fiber and ferrule by reacting with an adhesive composition containing methylene malonate.

Certain aspects of the present disclosure relate to components for fiber optic connectors. In certain examples, the component comprises of a ferrule with an inorganic hydrolysable layer deposited on the inner diameter of the ferrule. In certain examples an adhesion promotor is deposited on top of the inorganic hydrolysable layer.

Certain aspects of the present disclosure relate to methods of preparing components of fiber optic connectors. In certain examples these method involve applying an inorganic hydrolysable layer on the inner surface of a ferrule and then coating the inorganic hydroslysable layer with an adhesion promotor. In certain examples the adhesion promotor may comprise of an amine functionality, a glycidyl functionality, a thiol functionality, an oxirane functionality, or any combination thereof.

Certain aspects of the present disclosure relate to methods for bonding an optical fiber within a fiber opening of a ferrule using an adhesive. In certain examples these methods include applying an adhesion promotor to the ferrule using a vapor deposition process, such that the adhesion promotor reacts with the adhesive to promote adhesion between the ferrule and the optical fiber. Certain aspects of the present disclosure relate to methods of adhering an optical fiber in a ferrule. These methods include applying an adhesion promotor with an amine functionality or a thiol functionality at an interface between the optical fiber and the ferrule and securing the fiber within the fiber opening with a monomeric precursor of a methylene malonate polymer adhesive composition.

Certain aspects of the present disclosure relate to methods of adhering an optical fiber in a ferrule, by applying an adhesion promotor containing a glycidyl functionality or an oxirane functionality at an interface between the optical fiber and the ferrule and securing the fiber within the fiber opening with a monomeric precursor of a methylene malonate polymer adhesive composition that is polymerized by a chemical initiator.

DETAILED DESCRIPTION

Figure 1:
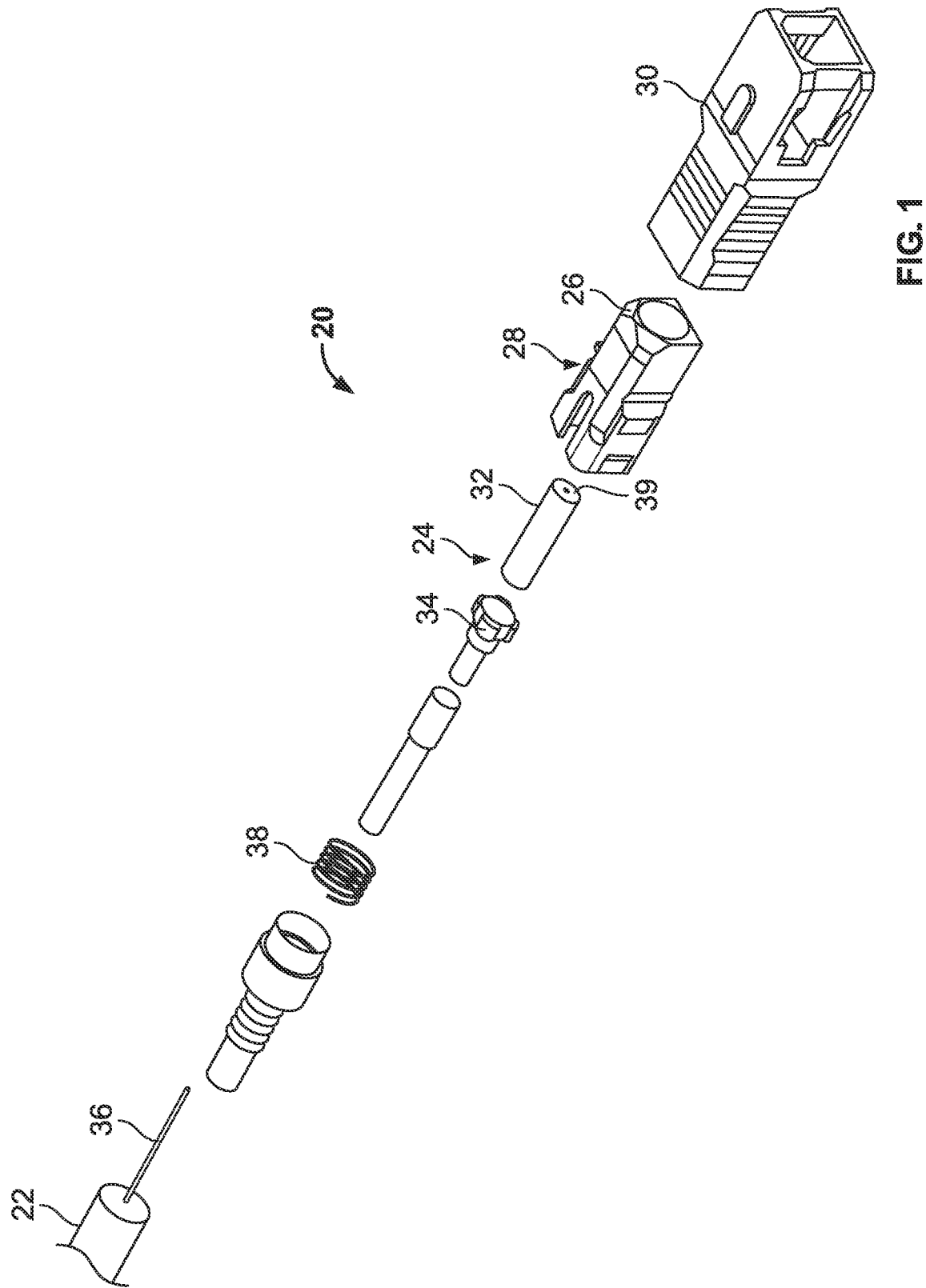
FIG. 1 is an exploded view of a prior art single-fiber optical connector.
Figure 2:
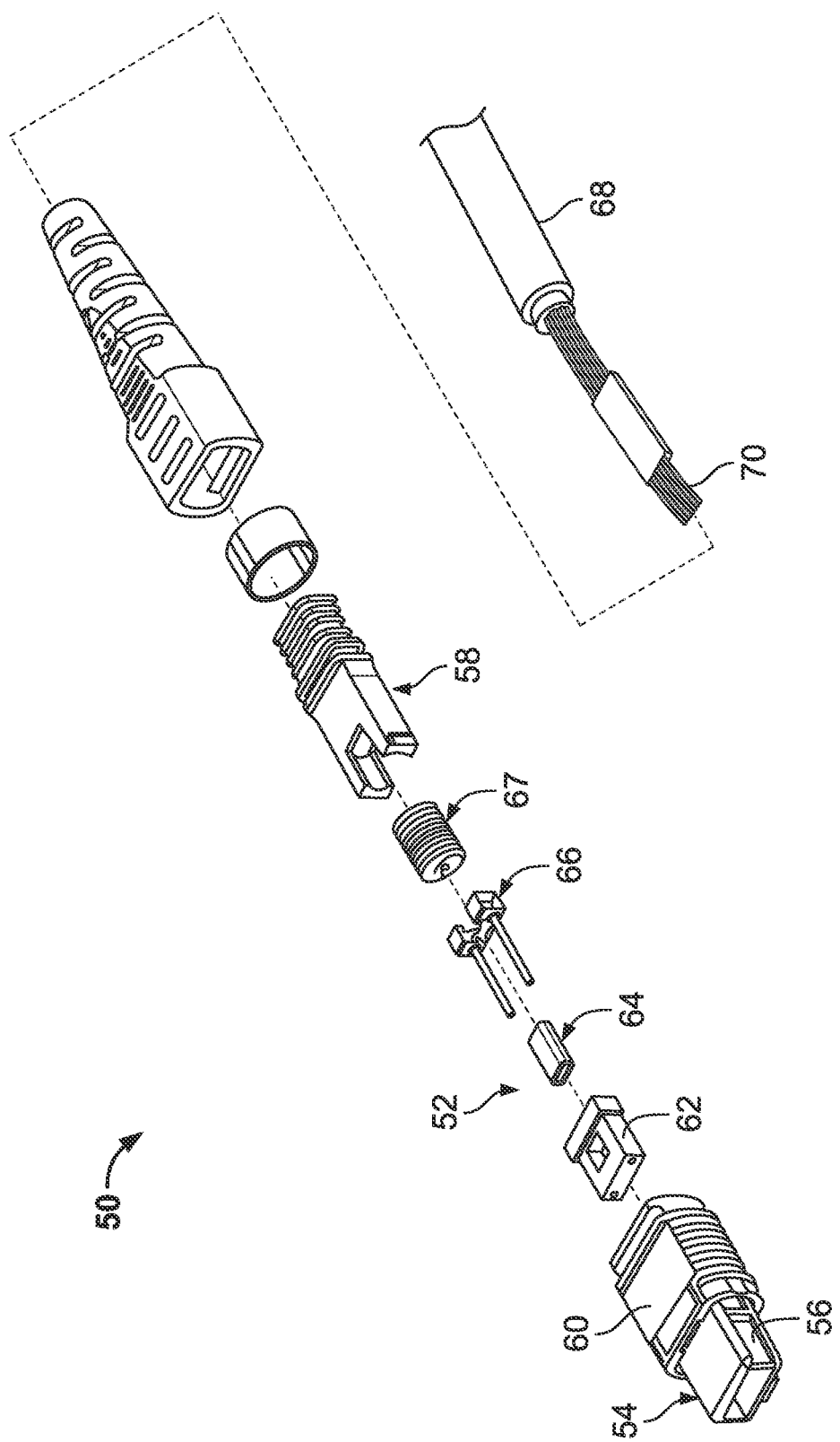
FIG. 2 is an exploded view of a prior art multi-fiber optical connector.

Aspects of the present disclosure relate to adhesives, coatings and processing techniques adapted to improve fiber optic connector manufacturing efficiency by reducing adhesive cure times associated with bonding optical fibers to ferrules. Certain aspects of the present disclosure relate to coatings used to initiate an adhesive cure reaction to reduce curing times associated with fiber-to-ferrule bonding. In certain examples, the coating can include a chemical cure initiator (e.g., an activator) for initiating curing of an adhesive used to bond the optical fiber to the ferrule. In certain examples the adhesive used to bond the optical fiber to the ferrule is a polymer of methylene malonate monomer. In certain examples, other adhesive monomers that can be used to bond optical fibers to ferrules include but are not limited to acrylates such as methyl acrylate, ethyl acrylate, butyl acrylate, tert-butyl acrylate, 2-ethylhexyl acrylate, ethylene glycol methyl ether acrylate, hydroxypropyl acrylate, iso-amyl acrylate, 2-phenoxyethyl acrylate, cyclohexyl acrylate, adamantan-1-yl acrylate, tetrahydrofurfuryl acrylate, dicyclopentyl acrylate, 2-cyanethyl acrylate, 2-(2-dimethylamino)ethyl acrylate, acrylonitrile, as well as other adhesive monomers known to those skilled in the art.

In certain examples, when the adhesive comprises a methylene malonate polymer, a wide variety of chemical cure initiators are suitable for accelerating cure rates including nucleophilic initiators capable of initiating polymerization. In certain examples, suitable chemical cure initiators include alkali metal salts, alkaline earth metal salts, ammonium salts, amine salts, halides (halogen containing salts), metal oxides, and mixtures containing such salts or oxides. Exemplary anions for such salts include anions based on halogens, acetates, benzoates, sulfur (thiol), carbonates, silicates, and the like. Specific examples of suitable chemical cure initiators for a methylene malonate polymer can include ionic compounds such a sodium benzoate, dihydrogen phosphonate terminated, or silane-terminated compounds. In certain examples the chemical cure initiator can include a silane-terminated composition with an amine functionality, or a thio functionality. In certain examples the chemical cure initiator can include silane-terminated composition with an amine functionality such as 3-aminopropyl-triethoxysilane. In certain examples, the chemical cure initiator is a dihydrogen phosphonate terminated composition with an amine functionality, or a thio functionality.

Specific silanes-terminated chemical cure initiators used herein include an amine functionality such as the amino-silanes shown as formula (I):

wherein R is an alkyl group having 1 to 4 carbon atoms and n is about 1 to about 24 carbon atoms ("$C_1$-$C_{24}$"), about 7 to about 24 carbon atoms ("$C_7$-$C_{24}$"), about 8 to about 24 carbon atoms ("$C_8$-$C_{24}$"), or about 9 to about 24 carbon atoms ("$C_9$-$C_{24}$"). An exemplary amino-silane of formula (I) is 3-aminopropyl-triethoxysilane.

In certain examples, the silane-terminated chemical cure initiator may include a sulfur (thiol) functionality such as thiol-silanes shown as formula (II):

wherein R is an alkyl group having 1 to 4 carbon atoms and n is about 1 to about 24 carbon atoms ("$C_1$-$C_{24}$"), about 7 to about 24 carbon atoms ("$C_7$-$C_{24}$"), about 8 to about 24 carbon atoms ("$C_8$-$C_{24}$"), or about 9 to about 24 carbon atoms ("$C_9$-$C_{24}$"). An exemplary thiol-silane of formula (II) is 2-mercaptoethyl-trimethoxysilane.

In certain examples of the present disclosure the chemical cure initiator is a dihydrogen phosphate having the structure of Formula (III):

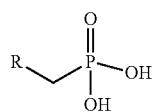

wherein R is intended to include an amine functionality, or a thio functionality. In certain examples the chemical cure initiator is a combination of a silane-terminated compound and a dihydrogen phosphonate terminated compound.

In certain aspects of the present disclosure, the adhesive can include a radical cure initiator that when used in combination with the chemical cure initiator enables dual curing of the adhesive. In one example, the radical cure initiator can promote activation of the adhesive when the adhesive is exposed to radiant energy (e.g., light, heat, etc.). For example, during bonding of an optical fiber within a ferrule, a first portion of the adhesive can have cure initiated by a chemical cure initiator while a second portion of the adhesive can have cure initiated by a radical cure initiator through the application of radiant energy (e.g., heat, light, etc.) to the adhesive.

In one example, the first portion of adhesive can be located radially between the optical fiber and the ferrule within a fiber opening of the ferrule, and the second portion of adhesive can be located adjacent at least one end of the ferrule. As used herein radical cure initiators are chemical compounds that produce free-radicals when exposed to heat, natural light, UV light, or redox conditions. These free-radicals then react with the adhesive to initiate cure. In certain examples, the radical cure initiator coating comprises a UV initiator of formula (IV):

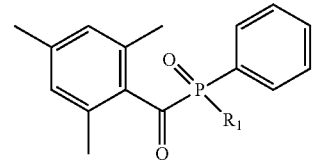

wherein $R_1$ is phenyl or $C_{1-10}$ alkoxy. In other examples the radical cure initiator coating comprises of a different free-radical initiator such as dicumyl peroxide, hydrogen peroxide, azoisobutylnitrile, persulfate, or metallocene containing compound. In one example, the radical cure initiator can include an ultraviolet light cure initiator such as ethyl phenyl (2,4,6-trimethylbenzoyl) phosphinate (TPO-L) as well as other radical initiators known to those in the art.

Aspects of the present disclosure also relate to adhesives, coatings and processing techniques adapted to provide effective bonding between an optical fiber and a ferrule. In certain examples, a coating may include an adhesion promoter. As used herein an adhesion promotor is a chemical compound which strengthens the bond between the optical fiber and the ferrule. In the case of an adhesive such as methylene malonate, example adhesion promoters include silane-terminated or dihydrogen phosphonate terminated compositions, such as 3-aminopropyl-triethoxysilane or (3-glycidyloxypropyl trimethoxysilane (GPTMS). In certain examples, adhesion promoters can provide both a cure initiation function and an adhesion promotion function. In certain examples, the adhesion promotor and the chemical cure initiator are the same chemical compound. In certain examples, the adhesion promotor is different from the chemical cure initiator.

Other types of silanes-terminated adhesion promotors include silanes with glycidyl functionality and silanes with oxirane functionality, wherein "glycidyl functionality" refers to the functional group having the structure of formula (V):

and wherein "oxirane functionality" refers to the functional group having the structure of formula (VI):

Specific examples of glycidyl-silanes include (3-glycidyloxypropyl)trimethoxysilane, (3-glycidyloxypropyl)triethoxysilane, and 8-(glycidoxyoctyl)trimethoxysilane, β-(3,4-epoxycyclohexyl)ethyl-trimethoxysilane. Exemplary oxirane-functional silanes include β-(3,4-epoxycyclohexyl) ethyl-triethoxysilane, 5,6-epoxylhexytrimethoxysilane, and 5,6-epoxyhexyltriethoxysilane. Other silanes containing a glycidyl functionality and/or oxirane functionality may also be used.

In certain aspects of the present disclosure, coatings including a chemical cure initiator and/or an adhesion promoter can be applied to the optical fiber, and/or within the fiber opening of the ferrule. Additionally, in some examples, adhesion promoters can be provided as part of the adhesive (e.g., an adhesion promoter such as GPTMS can be incorporated in an adhesive such as methylene malonate). It will be appreciated that the coatings can be applied by a number of different application techniques. Example application techniques can include dipping, wiping, spraying, liquid solution wetting, and applying via vapor deposition (e.g., chemical vapor deposition, molecular vapor deposition, atomic layer deposition, and plasma layer deposition).

In certain examples, the optical fiber and/or the ferrule can be processed by one or more cleaning processes. For example, the optical fiber can be cleaned through a wiping process that may include a cleaning agent including a solvent such as an alcohol (e.g. ethyl alcohol or isopropyl alcohol) or other suitable organic solvent known to those with skill in the art. In certain examples, the wiping process may include the simultaneous application of a chemical cure initiator and/or an adhesion promoter. For example, the chemical cure initiator can be dissolved in solvent of the cleaning agent such that the chemical cure initiator is concurrently applied to the optical fiber as the cleaning agent is wiped on the optical fiber. In certain examples, the optical fiber and/or the ferrule can be cleaned using a plasma cleaning process such as an $O_2$ plasma cleaning process.

Aspects of the present disclosure also relate to processing techniques utilizing multiple coating layers to provide effective adhesive bonding between an optical fiber and a ferrule. In one example, the ferrule has a composition including zirconia, and one of the layers includes an inorganic coating that forms hydrolyzable species such as silicate, ferrate, borate, or titanate. In some examples the hydrolysable species is $SiO_2$, $Fe_2O_3$, $B(OH)_3$, or $TiO_2$. In one example, the ferrule has a composition including zirconia, and one of the layers includes a silicate layer applied within a fiber opening of the ferrule, and another layer includes an adhesion promoting layer applied to the silicate layer within the fiber opening and optionally to the optical fiber. In certain examples the inorganic hydrolysable layer is derived from a silicate of formula (VII):

$$(OR)_3Si\text{—}X \qquad\qquad\qquad\qquad (VII)$$

where R represents hydrogen, alkyl groups, fluoroalkyl groups or alkyl groups substituted with other atoms or groups and X represents an alcohol or halide group. In certain examples the inorganic hydrolysable layer is a silicate derived from a tris(alkoxy)silanol compound. In certain examples the inorganic hydrolysable layer is derived from tris-(alkoxy)silane chloride. In certain aspects this hydrolysable layer arises from any of variety of deposition or application methods. Particularly useful are chemical vapor deposition, molecular vapor deposition, plasma deposition, or atomic layer deposition. In preferred examples, a layer of silicon dioxide is applied by chemical vapor deposition. In certain examples the thickness of the hydrolysable layer is less than 500 nm, less than 300 nm, less than 100 nm, or less than 50 nm thick. In certain examples the thickness of the inorganic hydrolysable layer is less than 1000 Å, less than 800 Å, less than 600 Å, less than 400 Å, or less than 200 Å in thickness. In one example, the adhesion promoting layer includes an amine terminated composition (e.g. 3-amino-propyl-triethoxysilane), and the adhesive includes methylene malonate. The silicon dioxide layer provides an intermediate layer at the inner diameter of the ferrule to which the adhesive can effectively bond with the assistance of the adhesion promoting layer. In other examples the adhesion promoting layer includes a glycidyl terminated composition (e.g. GPTMS), and the adhesive includes methylene malonate.

It will be appreciated that the chemical compositions of the coatings and processes used with respect to a given ferrule can depend upon the chemical composition of the material forming the ferrule. In this regard, single-fiber ferrules typically have a material composition that includes a ceramic material such as zirconia. In contrast, multi-fiber ferrules often have a polymeric construction including a material such as PPS. The polymeric material of the multi-fiber ferrule may also include a filler such as glass particles.

Figure 3:
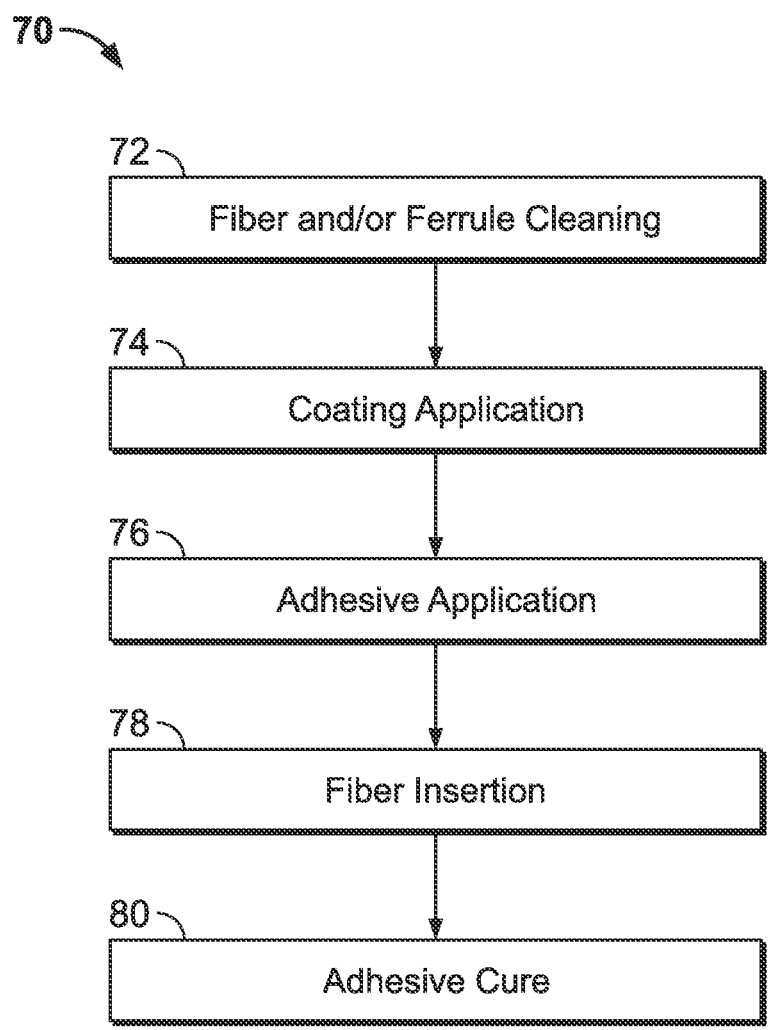
FIG. 3 is a method in accordance with the principles of the present disclosure.
Figure 4:
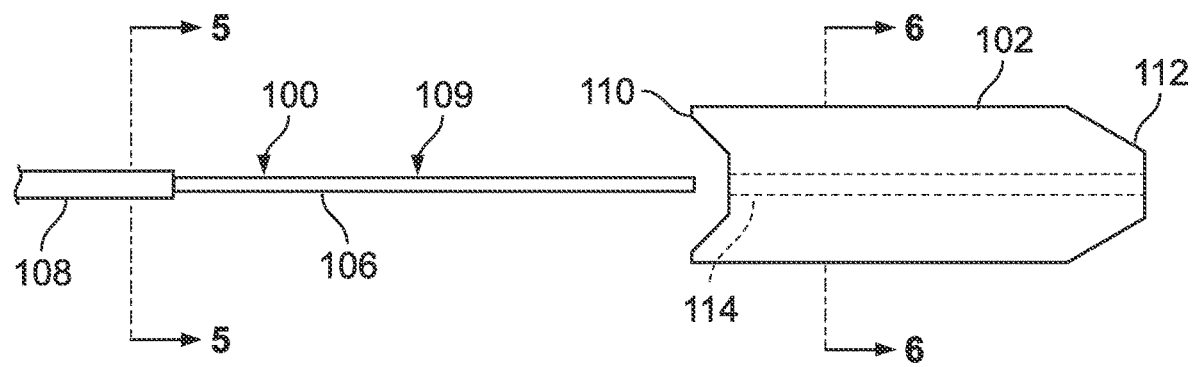
FIG. 4 is a side view of a ferrule and an optical fiber adapted to be inserted in the ferrule.
Figure 5:
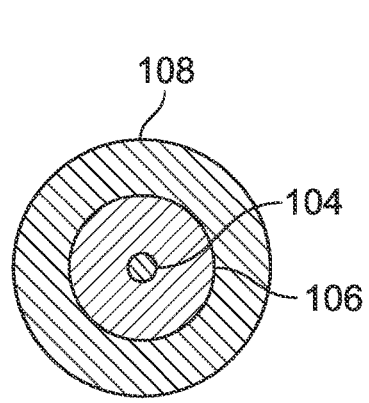
FIG. 5 is a cross-sectional view taken along section line 5-5 of FIG. 4.
Figure 6:
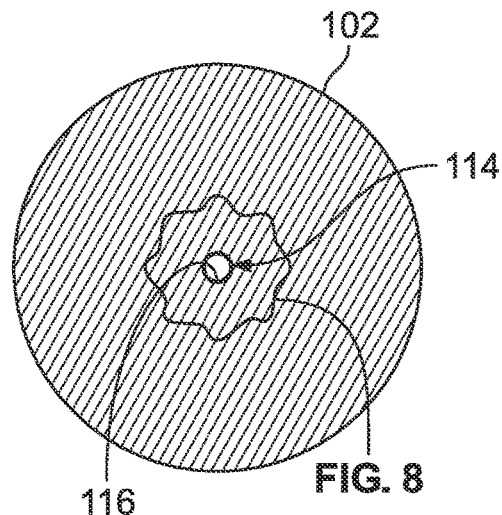
FIG. 6 is a cross-sectional view taken along section line 6-6 of FIG. 4.

FIG. 3 outlines an example method 70 for securing an optical fiber 100 (see FIG. 4) to a single-fiber ferrule 102 (see FIG. 4) having material composition that includes zirconia. As shown at FIG. 5, the optical fiber 100 includes a core 104, a cladding layer 106 surrounding the core 104 and a coating 108 surrounding the cladding layer 106. The cladding layer 106 and the core 104 have a composition including glass with the core 104 having a higher refractive index than the cladding layer 106. The coating layer 108 has a polymeric composition that can include a material such as acrylate. The portion of the fiber 100 secured within the ferrule 102 is a bare fiber portion 109 from which the coating layer 108 has been removed (e.g., via a stripping process). The ferrule 102 includes a proximal end 110 and an opposite distal end 112. The ferrule defines a fiber opening 114 (see FIG. 6) that extends through the ferrule 102 from the proximal end 110 to the distal end 112. The bare fiber portion 109 of the optical fiber 100 is adapted to be secured in the fiber opening 114 of the ferrule 102 by adhesive. An internal surface 116 of the ferrule 102 defines the fiber opening 114. The internal surface 116 (i.e., an inner diameter surface) defines an inner diameter ID that extends across the fiber opening 114. In a typical example, the core 104 has a diameter of about 10 microns, the cladding layer 106 has a diameter of about 125 microns, and the inner diameter ID is slightly larger than the diameter of the cladding layer 108. In one example, the inner diameter ID is in the range of 125-127 microns.

According to the method 70, the bare fiber portion 109 of the optical fiber 100 and optionally the ferrule 102 are initially cleaned (see step 72). During cleaning of the bare fiber portion 109 of the optical fiber 100, a wiping process using a solvent such as isopropyl alcohol can be used to remove coating debris from the bare fiber portion 109. During cleaning, cleaning operations such as $O_2$ plasma treatment can be used to further clean the exterior of the bare fiber portion 109 of the optical fiber 100 as well as the internal surface 116 of the ferrule 102.

Figure 7:
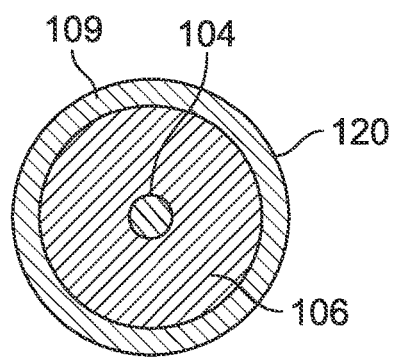
FIG. 7 is a cross-sectional view showing a bare optical fiber coated with an adhesion promoting layer.
Figure 8:
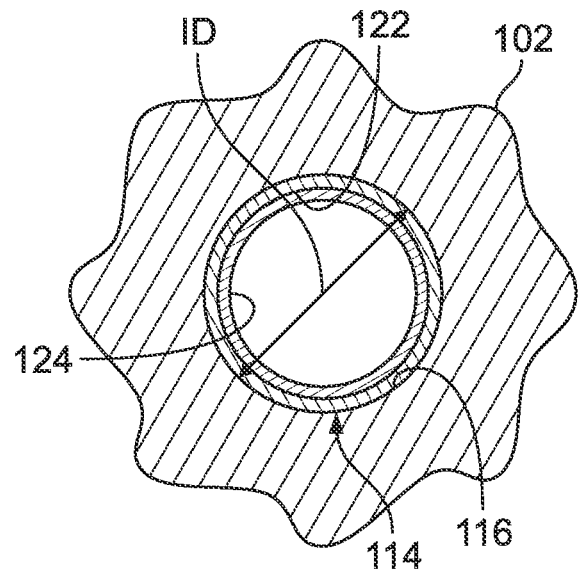
FIG. 8 is an enlarged view of a portion of FIG. 6.

Once the fiber 100 and optionally the ferrule 102 have been cleaned, one or more coating layers can be applied to the bare fiber portion 109 of the optical fiber 100 and/or to the internal surface 116 of the ferrule 102 (see step 74). In one example, chemical cure initiator 120 (see FIG. 7), such as 3-amino-propyl-triethoxysilane or sodium benzoate, is applied to the outer surface of the bare fiber portion 109. The coating can be applied to the bare fiber portion 109 by dipping, wiping, spraying or vapor deposition. It is also desirable to apply one or more coating layers to the internal surface 116 of the ferrule 102. Preferably, the coating layer or layers can be applied using a vapor deposition technique. In one example, two or more separate layers can be applied within the fiber opening 114 to the internal surface 116. For example, an intermediate layer 122 of an inorganic hydrolysable compound such as silica dioxide can be applied to the internal zirconia surface 116 of the ferrule 102, followed by an adhesion promotion layer 124 applied to the inorganic hydrolysable layer 112 within the fiber opening 114 (see FIG. 8). The adhesion promotion layer 124 can include a material such as amino-silane-terminated compound. It will be appreciated that the amino-silane layers can provide a chemical cure initiation function as well as an adhesion promoting function.

Once the coating layers have been applied, adhesive 126 can be applied (see step 76). An example adhesive is methylene malonate. The adhesive 126 can be applied by applying the adhesive to the bare fiber portion 109 of the optical fiber 100, by drawing or injecting the adhesive 126 into the fiber opening 114, or by placing a volume of the adhesive at the proximal end 110 of the ferrule 102 such that the bare fiber portion 109 is required to pass through the adhesive 126 during the fiber insertion process.

Figure 9:
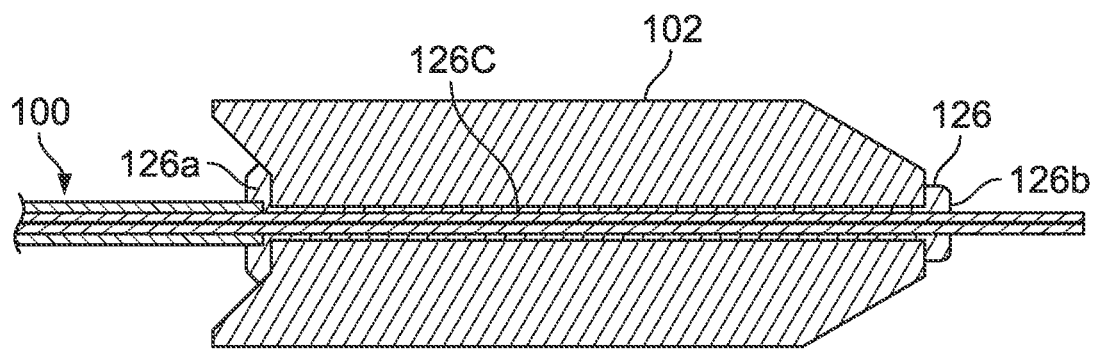
FIG. 9 shows the fiber of FIG. 4 inserted in the ferrule of FIG. 4.
Figure 10:
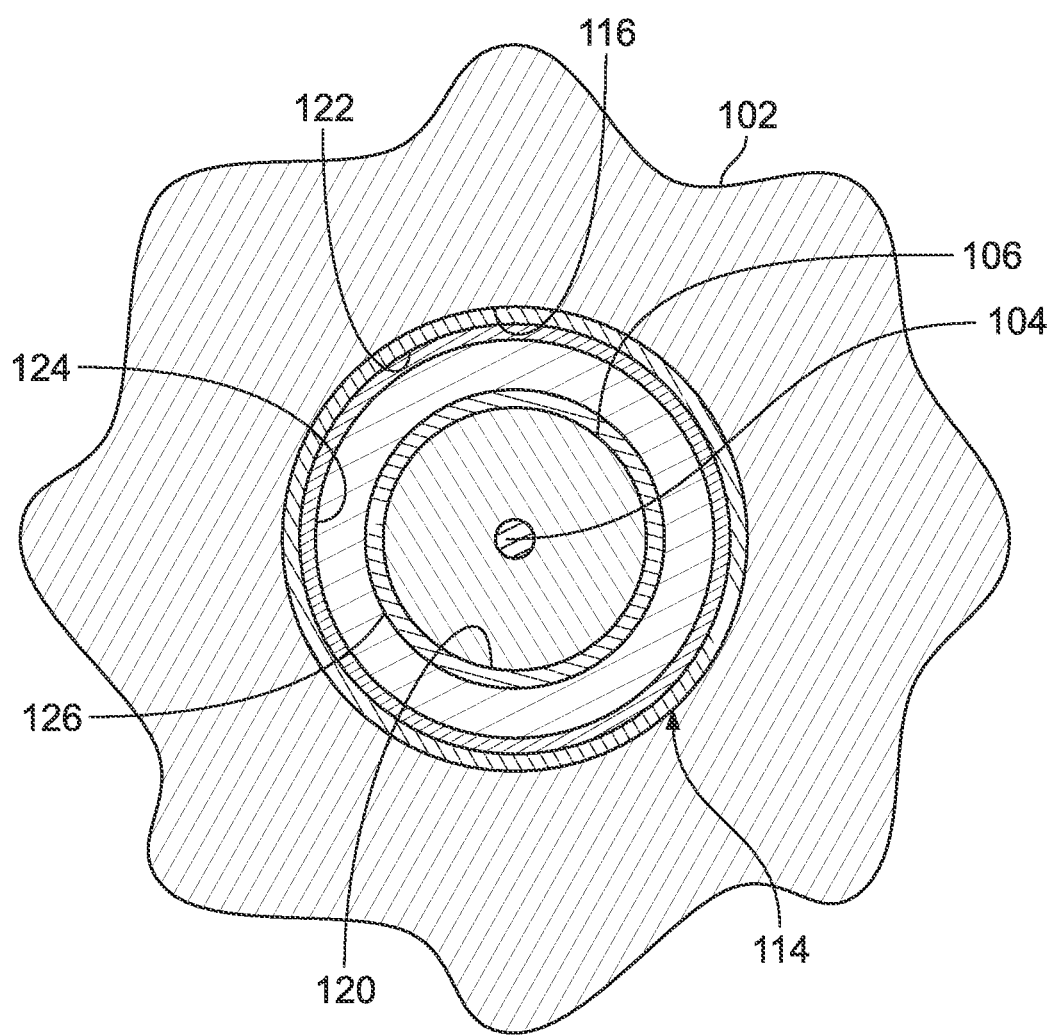
FIG. 10 is a cross-sectional view taken along section line 10-10 of FIG. 9.

After the adhesive application step 76, the bare fiber portion 109 of the optical fiber 100 is inserted into the fiber opening 114 (see step 78) of the ferrule 102 as shown at FIG. 9. The adhesive 126 is then cured (see step 80) to fix the bare fiber portion 109 axially relative to the ferrule 102. It will be appreciated that the one or more coating layers provided within the ferrule 102 and/or on the bare fiber portion 109 can provide initiation of the curing process to decrease the cure time of the adhesive within the fiber opening 114. In certain examples, the cure time is less than or equal to one minute, or less than or equal to forty-five seconds. In certain examples, the one or more coating layers also provide for enhanced bonding between the glass surface of the bare fiber portion 109 of the optical fiber 100 and the zirconia internal surface 116 of the ferrule 102. FIG. 10 is a cross-sectional view of the various layers upon insertion of the bare fiber portion 109 in the fiber opening 114 of the ferrule 102.

In an alternative example, a dual-cure method can be used for curing the adhesive to secure the optical fiber 100 within the ferrule 102 at curing step 80. For example, the adhesive material 126 can include a radical cure initiator (e.g., an ultraviolet (UV) light cure initiator such as TPO-L). The inclusion of the radical cure initiator within the adhesive 126 allows selected portions of the adhesive 126 to be cured through the application of radiant energy such as UV light. The ability to cure portions of the adhesive 126 using applied radiant energy is particularly advantageous for regions in which relatively large volumes of adhesive exist. For example, referring to FIG. 9, during bonding of the fiber 100 within the ferrule 102, relatively large volumes 126a, 126b of adhesive 126 are located adjacent the proximal end 110 and the distal end 112 of the ferrule 102. Because of the relatively size of the volumes 126a, 126b of the adhesive, the layers 120, 124 of chemical cure initiator are not as effective at reducing the cure time as would occur within the fiber opening 114 of the ferrule 102 where a portion 126c of the adhesive 126 has a thickness that is relatively small. It has been determined that by using a radiant energy cure process, the volumes of adhesive 126a, 126b at the ends of the ferrule 102 can be cured in less than 20 seconds, or less than 15 seconds or less than 10 seconds. The portion 126c of the adhesive 126 within the ferrule opening 114 is relatively thin and rapidly cures through chemical cure initiated by contact between the adhesive 126c and the adhesion promotion/chemical cure initiation layers 120, 124.

Figure 11:
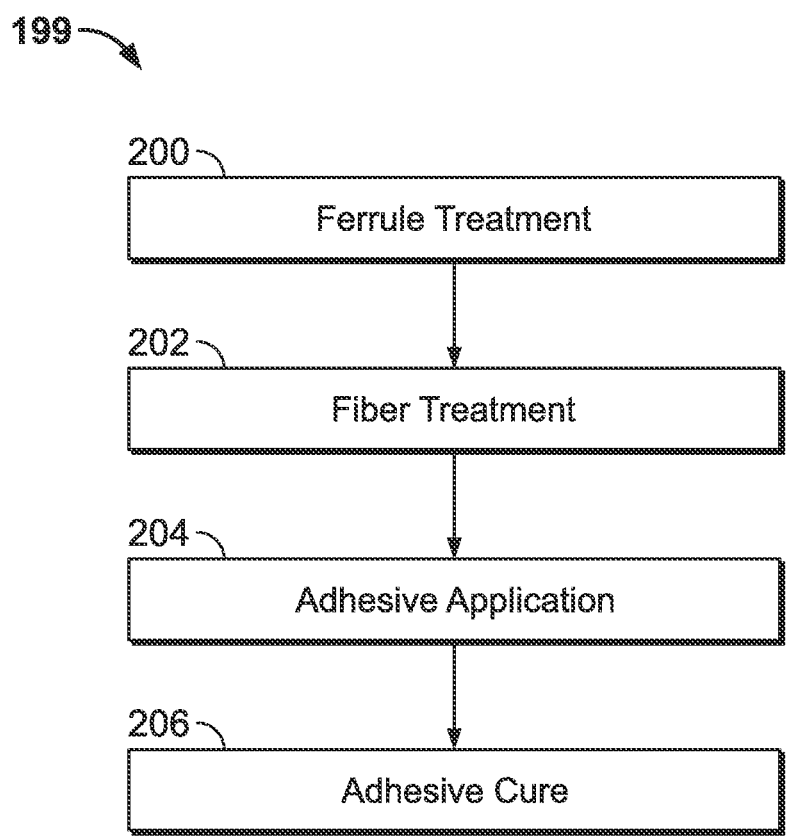
FIG. 11 is another method in accordance with the principles of the present disclosure.
Figure 12:
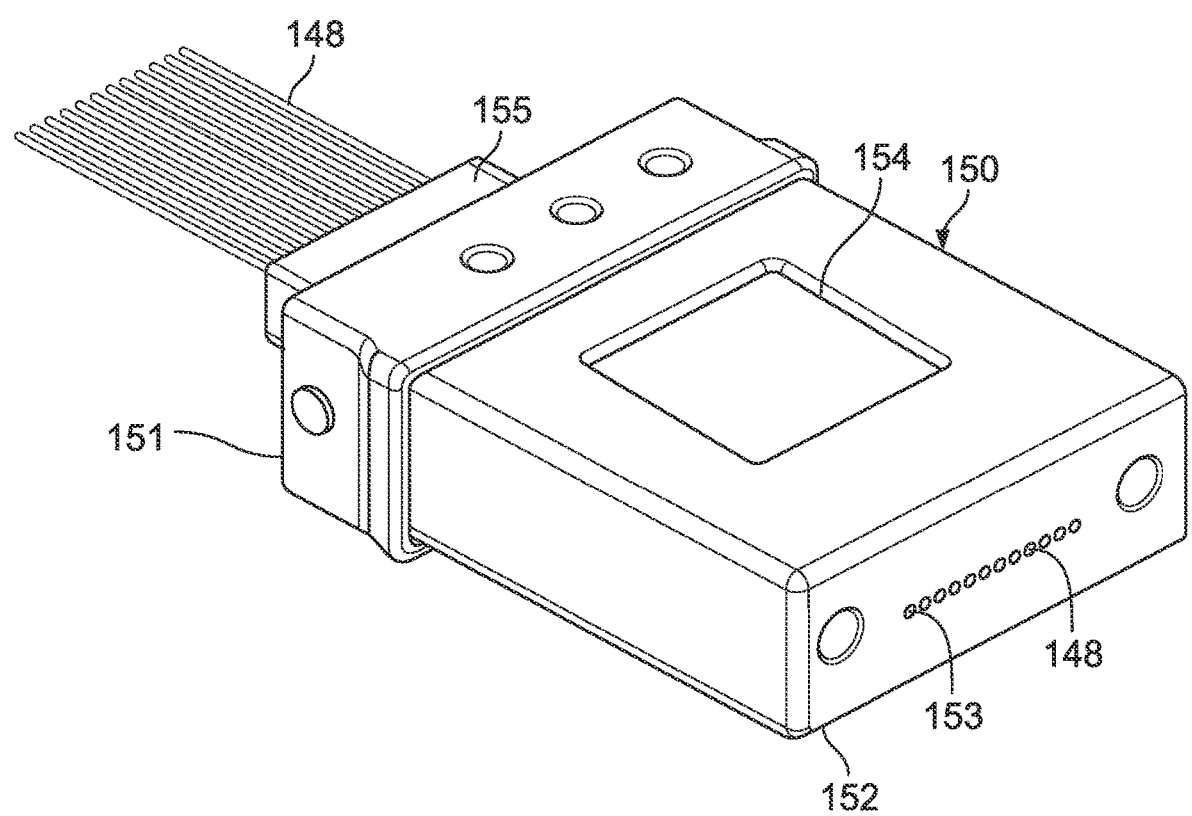
FIG. 12 is a perspective view of a multi-fiber ferrule.

FIG. 11 outlines an example method 199 for bonding optical fibers 148 to a multi-fiber ferrule 150 (see FIG. 12) such an MPO ferrule made of a polymeric material such as PPS containing glass filler. The multi-fiber ferrule 150 includes proximal end 151 positioned opposite from a distal end 152. Fiber openings 153 extend through the ferrule 150 in a proximal-to-distal direction. A side window 154 is provided within the ferrule 150 for allowing the application of adhesive material for securing the optical fibers 148 in the ferrule 150. A ferrule boot 155 is installed in the proximal end 151 of the ferrule 150.

Referring to step 200 of the method 199, the ferrule 150 is initially treated. For example, the fiber openings 153 of the ferrule 150 can be treated by an $O_2$ plasma process to provide initial cleaning. Subsequently, the fiber openings 153 of the ferrule 150 can be coated with an adhesion promoting coating for providing cure initiation and adhesion promoting functionality. In certain examples the thickness of the adhesion promotor is less than 500 nm, less than 300 nm, less than 100 nm, or less than 50 nm thick. In certain examples the thickness of the adhesion promotor is less than less than 200 Å, less than 100 Å, less than 50 Å, less than 20 Å, or less than 10 Å in thickness. At step 202, the optical fibers 148 can be treated. As part of the treatment, the optical fibers 148 can be cleaned. After cleaning, a chemical cure initiator coating can be applied to the optical fibers by a method such as such as dipping, wiping, spraying, or a vapor deposition process. In certain examples, the chemical cure initiator may be dissolved within isopropyl alcohol of a wipe such that wiping of the optical fibers concurrently cleans the optical fiber and applies the chemical cure initiator layer. In certain examples, the concentration of chemical cure initiator in the isopropyl alcohol is in the range of 1-10%, or 2-7%, or about 5%.

At step 204, adhesive is applied. The adhesive can be applied to the optical fibers 148, and/or can be applied to the ferrule 150. To apply adhesive to the ferrule 150, the adhesive can be injected or drawn into the fiber openings 153 of the ferrule 150. The adhesive can also be applied through the side window 154 of the ferrule 150. In certain examples, the adhesive can be applied at the ends 151, 152 of the ferrule 150. Once the adhesive has been applied, the pre-treated optical fibers 148 are inserted into the fiber openings 153. The adhesive can include a base-cure initiated adhesive such as methylene malonate. The adhesive also preferably includes a radical cure initiator (e.g., a UV cure initiator such as TPO-L). Upon insertion of the optical fibers 148 in the fiber openings 153, the chemical cure initiator coatings initiate the cure of the adhesive within the fiber openings 153 (see step 206). It will be appreciated that larger volumes of adhesive exist at the side window 154 of the ferrule 150, and at the proximal and distal ends 151, 152 of the ferrule 150. In certain examples, these regions may be exposed to radiant energy (e.g., UV light via a mercury vapor cure system having broadband wavelength) to initiate curing (step 206). Each of the regions can be separately cured using a single spot radiant energy cure set up. Alternatively, flood system can be used to currently expose all three regions to radiant energy at the same time to reduce the cure time.

Definitions

As used herein, the term "alkyl" is intended to include branched, straight chain and cyclic, substituted or unsubstituted saturated aliphatic hydrocarbon groups. Alkyl groups can comprise about 1 to about 24 carbon atoms ("$C_1$-$C_{24}$"), about 7 to about 24 carbon atoms ("$C_7$-$C_{24}$"), about 8 to about 24 carbon atoms ("$C_8$-$C_{24}$"), or about 9 to about 24 carbon atoms ("$C_9$-$C_{24}$"). Alkyl groups can also comprise about 1 to about 8 carbon atoms ("$C_1$-$C_8$"), about 1 to about 6 carbon atoms ("$C_1$-$C_6$"), or about 1 to about 3 carbon atoms ("$C_1$-$C_3$"). Examples of $C_1$-$C_6$ alkyl groups include, but are not limited to, methyl, ethyl, propyl, isopropyl, n-butyl, isobutyl, tert-butyl, n-pentyl, neopentyl and n-hexyl radicals.

As used herein, the term "alkoxy" refers to linear or branched oxy-containing groups each having alkyl portions of one to about twenty-four carbon atoms or, preferably, one to about twelve carbon atoms. Examples of such radicals include methoxy, ethoxy, propoxy, butoxy and tert-butoxy.

As used herein, the term "alkylaryl" refers to an alkyl group with an aryl group bonded thereto. An exemplary alkylaryl group is a "phenylalkyl" which refers to a cyclic group of atoms with the formula —R—$C_6H_5$, wherein R is a group containing a linear or branched alkyl group.

As used herein, the terms "amine" and "amino" are used interchangeably and shall mean —$NH_2$, —NHR or —$N(R)_2$, wherein R is alkyl.

As used herein, the term "thio" or "mercapto" are used interchangeably and shall mean —SH or —SR, wherein R is a group containing a linear or branched alkyl group comprising about one to about twelve carbon atoms attached to a divalent sulfur atom.

In the present disclosure, the term "silane-terminated" refers to organoalkoxysilanes, i.e. compounds in which, on the one hand, at least one, usually two or three, alkoxy groups are bonded directly to the silicon atom (via an Si—O bond) and to the others have at least one directly to the silicon atom (via a Si—C bond) bound organic radical. Similarly, the term "silane group" refers to the silicon-containing group attached to the organic moiety of an organoalkoxysilane. Designations such as "α-aminosilane" or "γ-aminosilane" indicate that one said functional group is in a position specific to the silicon atom. As "α-functional" silanes or silane groups are referred to, the organic radical is in the α-position (1-position) to the silicon atom with a functional group, for example, an isocyanate group or an amino group substituted. As "β-functional" silanes or silane groups are referred to, the organic radical in the β-position (2-position) to the silicon atom with a functional group. As silanes or silane groups are referred to as "γ-functional" when the organic group in the γ-position (3-position) to the silicon atom is substituted with a functional group. As silanes or silane groups are referred to as "δ-functional" silanes or silane groups, the organic radical in the δ-position (4-position) to the silicon atom is substituted with a functional group.

In the present disclosure, the term "dihydrogen phosphate terminated" refers to organo-alkyl-phosphate having the structure of Formula (III):

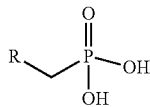

wherein R is intended to include branched, straight chain and cyclic, substituted or unsubstituted saturated aliphatic hydrocarbon groups. Designations such as "α-amino-dihydrogen phosphate" or "γ-amino-dihydrogen phosphate" indicate that one said functional group is in a position specific to the phosphorus atom. As "α-functional" groups are referred to, the organic radical is in the α-position (1-position) to the phosphorus atom with a functional group, for example, an isocyanate group or an amino group substituted. As "β-functional" groups are referred to, the organic radical in the β-position (2-position) to the phosphorus atom with a functional group. As "γ-functional" when the organic group in the γ-position (3-position) to the phosphorus atom is substituted with a functional group. As "δ-functional" groups, the organic radical in the δ-position (4-position) to the phosphorus atom is substituted with a functional group.

Specific examples of dihydrogen phosphate compounds as used herein may include amine functional or thiol functional dihydrogen phosphonates such as: 2-aminoethyl dihydrogen phosphate, 1-aminopropyl dihydrogen phosphate, 3-aminopropyl dihydrogen phosphate, 2-sulfanylethyl dihydrogen phosphate, 3-sulfanylpropyl dihydrogen phosphate, and tridecyl dihydrogen phosphate. Other dihydrogen phosphate compounds used herein may include glycidyl functionalities having the structure of formula (IV) or oxirane functionalities having the structure of formula (V).

As discussed above, in certain examples of the present disclosure the adhesive is a "methylene malonate" polymer formed from methylene malonate monomers that are 1,1-disubstituted alkenes having the general formula (VIII):

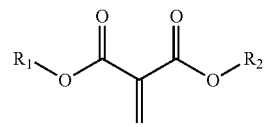

wherein $R_1$ and $R_2$ are each hydrocarbyl groups that may be the same or different substituents. Hydrocarbyl as used herein refers to a group containing one or more carbon atom backbones and hydrogen atoms, which may optionally contain one or more heteroatoms. Where the hydrocarbyl group contains heteroatoms, the heteroatoms may form one or more functional groups well known to one skilled in the art. Heteroatoms means nitrogen, oxygen, sulfur, and phosphorus. Hydrocarbyl groups may contain cycloaliphatic, aliphatic, aromatic, or any combination of such segments. The aliphatic segments can be straight or branched. The aliphatic and cycloaliphatic segments may include one of more double and/or triple bonds. Included in hydrocarbyl groups are alkyl, alkenyl, alkynyl, aryl, cycloalkyl, cycloalkenyl, alkaryl, and aralkyl groups. Cycloaliphatic groups may contain both cyclic portions and noncylic portions. Examples of $R_1$ and $R_2$ include an alkyl group having 1-12 carbon atoms ($C_1$-$C_{12}$), an alkoxy group having 1-12 carbon atoms ($C_1$-$C_{12}$), an alkoxyalkyl wherein the alkoxy group has 1-12 carbon atoms and the alkyl group has 1-12 carbon atoms ($C_1$-$C_{12}$), fenchyl, methyl, phenyl, and phenylalkyl where the alkyl group has 1-12 carbon atoms. Examples of monomers including methylene malonate include, for example, methyl propyl methylene malonate, dihexyl methylene malonate, diisopropyl methylene malonate, butyl methyl methylene malonate, ethoxyethyl ethyl methylene malonate, methoxyethyl methyl methylene malonate, hexyl methyl methylene malonate, dipentyl methylene malonate, ethyl pentyl methylene malonate, methyl pentyl methylene malonate, ethyl methoxyethyl methylene malonate, ethoxyethyl methyl methylene malonate, butyl ethyl methylene malonate, dibutyl methylene malonate, diethyl methylene malonate (DEMM), diethoxyethyl methylene malonate, dimethyl methylene malonate, di-n-propyl methylene malonate, ethyl hexyl methylene malonate, fenchyl methyl methylene malonate, menthyl methyl methylene malonate, 2-phenylpropyl ethyl methylene malonate, and dimethoxyethyl methylene malonate. The polymer can be made from one kind of methylene malonate monomer (i.e., a homopolymer) two or more kinds of methylene malonate monomers (i.e., a copolymer). The methylene malonate polymer can also be formed from other monomers in addition to one of more kinds of methylene malonate monomer.

As discussed above, in certain examples of the present disclosure the chemical cure initiator and/or adhesion promotor comprises of an amino-silane of formula (I), wherein the amine functionality may be located in any one of the α, β, γ, or δ positions from the silicon atom. In some embodiments, the alkyl backbone of formula (I) is linear. In other embodiments the alkyl backbone of formula (I) is branched. In some embodiments, the amino-silane is selected from the group consisting of: 3-aminopropyl-triethoxysilane. Other amino-silanes used herein include 3-aminopropyl-trimethoxysilane, 4-aminobutyl-triethoxysilane, N-methyl-3-amino-2-methylpropyl-trimethoxysilane, N-ethyl-3-amino-2-methylpropyl-trimethoxysilane, N-ethyl-3-amino-2-methyl-aminopropyl-triethoxysilane, N-ethyl-3-amino-2-methyl-propyl-methyl-dimethoxysilane, N-ethyl-3-amino-2-methyl-propyl-methyl-diethoxysilane, N-butyl-3-amino-2-methylpropyl-trimethoxysilane, 3-(N-methyl-2-methyl-1-ethoxy)-aminopropyl-trimethoxysilane, N-ethyl-4-amino-3,3-dimethyl-butyl-methyl-dimethoxysilane, N-ethyl-3,3-4-amino-dimethylbutyl-trimethoxysilane, N-(cyclohexyl)-3-aminopropyl-trimethoxysilane, N-(2-aminoethyl)-3-amino-trimethoxysilane, N-(2-aminoethyl)-3-aminopropyl-triethoxysilane, N-(2-aminoethyl)-3-aminopropyl-methyl-dimethoxysilane, 1-aminopropyl-triethoxysilane, bis-(3-trimethoxysilyl-2-methylpropyl)-amine, N-(3'-trimethoxysilylpropyl-yl)-3-amino-methyl-trimethoxysilane or combinations thereof.

As discussed above, in certain examples of the present disclosure the chemical cure initiator and/or adhesion promotor comprises of a thiol functionality of formula (II). Other specific thiol-silanes used herein include 3-mercaptopropyl trimethoxysilane, 2-mercapto-propyl triethoxysilane, 3-mercapto-propyl-triethoxysilane, 2-mercapto-ethyl-tripropoxysilane, 2-mercapto-ethyl-tri-sec-butoxysilane, 3-mercapto-propyl-tri-t-butoxysilane, 3-mercapto-propyl-triisopropoxysilane, 3-mercapto-propyl-triethoxyoctylsilane, 2-mercapto-ethyl-2'-ethylhexoxysilane, 2-mercaptoethyl dimethoxy-ethoxysilane, 3-mercaptopropyl-methoxy-ethoxy-propoxysilane, 3-mercaptopropyl-dimethoxy-methylsilane, 3-mercaptopropyl methoxy-dimethylsilane, 3-mercaptopropyl-ethoxy-dimethylsilane, 3-mercaptopropyl-diethoxy-methylsilane, 3-mercaptopropyl-dimethoxy-cyclohexyloxysilane, 4-mercaptobutyl-trimethoxysilane, 3-mercapto-3-methyl-aminopropyl-trimethoxysilane, 3-mercapto-3-methylpropyl-tripropoxysilane, 3-mercapto-3-ethylpropyl-dimethoxy-methylsilane, 3-mercapto-2-methylpropyl-trimethoxysilane, 3-mercapto-2-methylpropyl-dimethoxy-phenylsilane, 3-mercapto-cyclohexyl-trimethoxysilane, 12-mercaptododecyl-trimethoxysilane, 18-mercapto-octadecyl-trimethoxysilane, 18-mercapto-octadecyl-dimethyl-methoxysilane, 2-mercapto-2-methyl-ethyl-tripropoxysilane, 2-mercapto-2-methylethyl-trioctylsilane, 2-mercapto-phenyl-trimethoxysilane, 2-mercapto-phenyl-triethoxysilane, 2-mercapto-tolyl-trimethoxysilane, 2-mercapto-tolyl-triethoxysilane, 1-mercapto-methyl-tolyl trimethoxysilane, 1-mercapto-tolyl-methyl-triethoxysilane, 2-mercaptoethyl-phenyl trimethoxysilane, 2-phenyl-mercapto-ethyl-triethoxysilane, 2-mercapto-ethyl-tolyl-trimethoxysilane, 3-mercapto-propyl-trimethoxysilane, 3-phenylmercapto-propyl-triethoxysilane or combinations thereof.

In certain aspects of the present disclosure, the chemical cure initiator coating composition is particularly well suited to activate polymerization of an adhesive coating, effectively lessening the cure time for adhesion. In certain aspects of the present disclosure, the chemical cure initiator is layered on top of an intermediate layer which promotes adhesion between the optical fiber and ferrule. In certain aspects of the present disclosure, the intermediate layer comprises of an inorganic layer and the chemical cure initiator is an organic compound.

It is to be understood that other embodiments may be utilized and structural or logical changes may be made without departing from the scope of the present disclosure.

EXAMPLES

Figure 13:
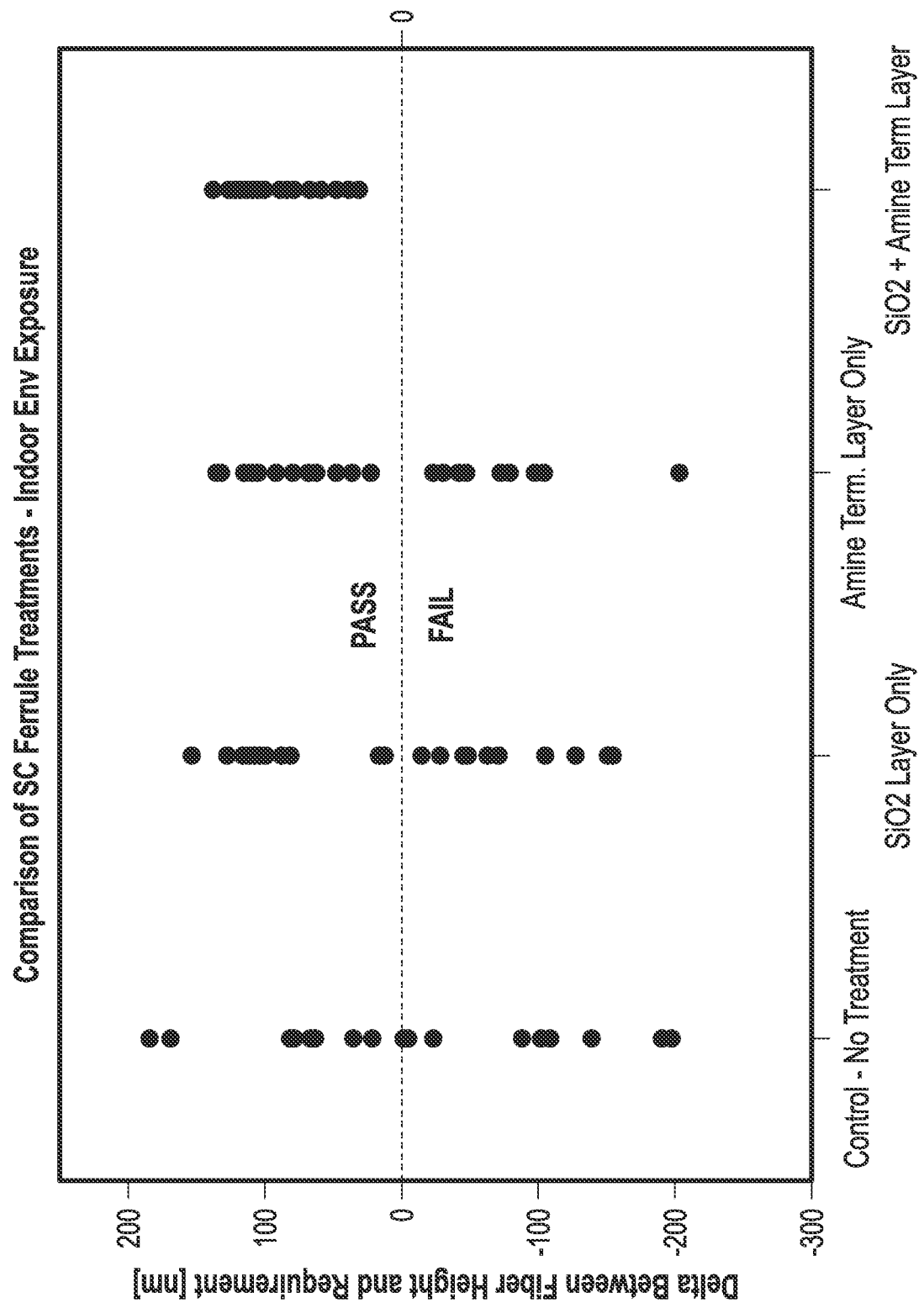
FIG. 13 shows results of an indoor aging test for ferrules treated by molecular vapor deposition to provide a silica coating ($SiO_2$) (Group 1), a coating of a composition with an amine functionality (Group 2), a silica coating and then an overlying coating of a composition with an amine functionality (Group 3), or left untreated as a (Control).

Zirconia ferrules were treated by molecular vapor deposition to provide an uniform silicate layer with hydrolysable bonds (Group 1, $SiO_2$ only), an adhesion promotor only containing 3-aminopropyl-triethoxysilane (Group 2, Amine Term. Layer Only), a silicate layer and then an overlying coating of the adhesion promotor 3-aminopropyl-triethoxysilane (Group 3, $SiO_2$+Amine Term Layer), or left untreated (Control). The chemical cure initiator for Groups 1-4 was provided by sodium benzoate. Fiber heights were measured and the ferrules were then subjected to an indoor aging test for four days at low temperature (−10° C.), high temperature (60° C.), or high humidity (40° C./95% RH). The fiber heights were measured again after aging. As a given enface geometry may affect the force applied to the fiber (and thus stress on the adhesive bond) the following equation was used to normalize fiber height across the example groups:

$$\text{Max Recess: } 1998*R^{(-0.795)} - R*10^6 + \sqrt{(R^2*10^6 - A^2)} *10^3 - 60$$

where R=Radius of Curvature of the ferrule in mm and A=apex of the ferrule in μm. This formula accounts for each ferrule having unique endface characteristics. The Group 3 ferrules (30 out of 30) met the fiber height requirement. The Group 3 ferrules also passed the indoor aging test as shown in FIG. 13. Fiber height was sufficiently maintained following exposure at −10° C., 60° C., and 40° C./95% RH. The Group 3 ferrules also had the most consistent performance among the groups tested. The term "most consistent" means that Group 3 had the smallest amount of post-test fiber height variation within the group.

Aspect 1. A method of adhering an optical fiber in a ferrule, comprising:
  providing a chemical cure initiator at an interface between the optical fiber and the ferrule;
  providing an adhesive composition at the interface between the optical fiber and the ferrule, the adhesive composition comprising a monomeric precursor of a methylene malonate polymer and a radical cure initiator of formula (VI):

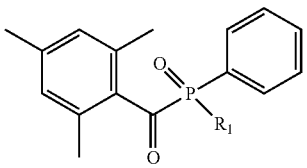

wherein R$_1$ is phenyl or C$_{1-10}$ alkoxy; and
polymerizing the adhesive composition thereby adhering the optical fiber in the ferrule.

Aspect 2. The method of aspect 1, wherein the step of providing a chemical cure initiator at an interface between the optical fiber and the ferrule further comprises: coating the optical fiber with the chemical cure initiator; and inserting the coated optical fiber into the fiber opening in the ferrule.

Aspect 3. The method of aspect 1 or 2, wherein the chemical cure initiator is selected from the group consisting of: an alkali metal salt, an alkaline earth metal salt, an ammonium salt, an amine salt, a halide, a metal oxide, and mixtures containing such salts or oxides.

Aspect 4. The method of any of aspects 1-3, where in the chemical initiator is an anion based on a salt selected from the group consisting of: a halogen, an acetate, a benzoate, a sulfur (thiol), a carbonate, an amine, or a silicate.

Aspect 5. The method of any of aspects 1-4, wherein the chemical cure initiator is an amino-silane.

Aspect 6. The method of any of aspects 1-4, wherein the amino-silane is 3-aminopropyltriethoxysilane.

Aspect 7. The method of any of aspects 1-6, wherein a polymerization time until fixation of the optical fiber in the ferrule is about 5 to about 30 seconds.

Aspect 8. The method of any of aspects 1-6 wherein the polymerization time until fixation of the optical fiber in the ferrule is about 30 to about 60 seconds.

Aspect 9. The method of any of aspects 1-6, wherein the polymerization time until fixation of the optical fiber in the ferrule is about 5 to about 10 seconds.

Aspect 10. The method of any of aspects 1-4, wherein the chemical cure initiator coating comprises of sodium benzoate.

Aspect 11. The method of any of aspects 1-10 wherein providing the chemical cure initiator on the optical fiber comprises applying a liquid solution of the activator coating to the optical fiber.

Aspect 12. The method of any of aspects 1-11, wherein the radical cure initiator is trimethylbenzoyl diphenylphosphine oxide (i.e. diphenyl(2,4,6-trimethylbenzoyl)phosphine oxide).

Aspect 13. The method of any of aspects 1-11, wherein the radical cure initiator is ethoxy-(2,4,6-trimethylbenzoyl) phenyl phosphinate.

Aspect 14. A method for bonding an optical fiber within a fiber opening of a ferrule using an adhesive, the method comprising:
initiating curing of a first portion of the adhesive via a chemical cure initiator and initiating curing of a second portion of the adhesive via a radical cure initiator.

Aspect 15. The method of aspect 14, wherein the first portion of adhesive is located within the fiber opening radially between the optical fiber and an inner diameter surface of the ferrule.

Aspect 16. The method of aspects 14 or 15, wherein the second portion of adhesive is at a proximal or distal end of the ferrule.

Aspect 17. The method of any of aspects 14-16, wherein the second portion of adhesive is at a side window of the ferrule.

Aspect 18. The method of any of aspects 14-17, wherein the chemical cure initiator is applied as a coating within the fiber opening of the ferrule prior to insertion of the optical fiber in the fiber opening.

Aspect 19. The method of any of aspects 14-18, wherein the chemical cure initiator is applied directly to an inner diameter surface of the ferrule.

Aspect 20. The method of any of aspects 14-19, wherein the chemical cure initiator is applied using a vapor deposition process.

Aspect 21. The method of any of aspects 14-20 wherein the ferrule is an MPO ferrule having a composition that includes PPS.

Aspect 22. The method of any of aspects 14-21, wherein the adhesive composition comprises a monomeric precursor of a methylene malonate polymer.

Aspect 23. The method of any of aspects 14-22, wherein the chemical cure initiator comprises of: an amine functionality, or a thiol functionality.

Aspect 24. The method of any of aspects 14-23, wherein the radical cure initiator coating comprises a UV initiator of formula (VI):

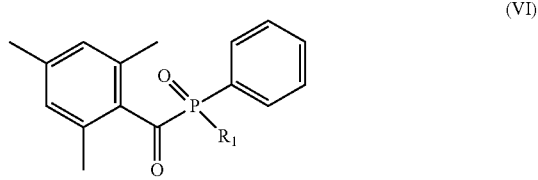

(VI)

wherein R$_1$ is phenyl or C$_{1-10}$ alkoxy.

Aspect 25. A method of adhering an optical fiber in a ferrule, comprising:
providing an adhesion promotor at an interface between the optical fiber and the ferrule, the adhesion promotor; and
securing the fiber within the fiber opening via an adhesive composition comprising a monomeric precursor of a methylene malonate polymer that is polymerized by a chemical initiator and a radical cure initiator when the optical fiber is inserted into the ferrule.

Aspect 26. The method of aspect 25, wherein the chemical cure initiator is applied to the optical fiber prior to insertion of the optical fiber in the ferrule.

Aspect 27. The method of aspect 25 or 26, wherein the adhesion promotor is applied as a coating within a fiber opening of the ferrule prior to insertion of the optical fiber in the fiber opening.

Aspect 28. The method of any of aspects 25-27, wherein the adhesion promotor is applied directly to an inner diameter surface of the ferrule.

Aspect 29. The method of any of aspects 25-28, wherein the adhesion promotor is applied using a vapor deposition process.

Aspect 30. The method of any of aspects 25-29, wherein the ferrule is an MPO ferrule having a composition that includes PPS.

Aspect 31. The method of any of aspects 25-30, wherein the adhesion promotor comprises of a silane-terminated compound including: an amine functionality, a glycidyl functionality, a thiol functionality, or an oxirane functionality.

Aspect 32. The method of any of aspects 25-31, wherein the radical cure initiator coating comprises a UV initiator of formula (VI):

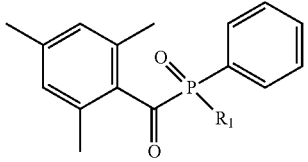

wherein $R_1$ is phenyl or $C_{1-10}$ alkoxy.

Aspect 33. The method of any of aspects 25-32, wherein the adhesion promotor and the chemical cure initiator are the same compound.

Aspect 34. A component for a fiber optic connector, comprising:
a ferrule having an inner diameter surface;
an inorganic hydrolyzable layer on the inner diameter surface; and
an adhesion promotor on the hydrolyzable layer.

Aspect 35. The component of aspect 34, wherein the adhesion promotor comprises a silane-terminated compound selected from the group consisting of: an amine functionality, a glycidyl functionality, a thiol functionality, and an oxirane functionality.

Aspect 36. The component of aspect 34 or 35, wherein the adhesion promotor comprises of an amino-silane of formula (I)

$$H_2N-(CH_2)_n-Si(OR)_3 \qquad (I).$$

Aspect 37. The component of aspect 34 or 35, wherein the adhesion promotor coating comprises of a silane-terminated compound with a glycidyl functionality.

Aspect 38. The component of any of aspects 34-37, wherein the inorganic hydrolysable layer is selected from the group consisting of: a silicate, a borate, or a titanate.

Aspect 39. The component of any of aspects 34-38, wherein the ferrule comprises zirconia.

Aspect 40. The component of any of aspects 34-39, herein the inorganic hydrolysable layer is a silicate.

Aspect 41. A method of preparing a component for a fiber optic connector, comprising:
providing a ferrule having an inner diameter surface;
applying an inorganic hydrolysable layer to the inner diameter surface;
coating the inorganic hydrolysable layer with an adhesion promotor comprising an amine functionality, a glycidyl functionality, a thiol functionality, an oxirane functionality, or any combination thereof.

Aspect 42. The method of aspect 41, wherein the adhesion promotor comprises of an amino-silane of formula (I)

$$H_2N-(CH_2)_n-Si(OR)_3 \qquad (I).$$

Aspect 43. The method of aspect 41 or 42, wherein the inorganic hydrolysable layer is applied by vapor deposition.

Aspect 44. The method of any of aspects 41-43, wherein the inorganic hydrolysable layer comprises of silicate.

Aspect 45. The method of any of aspects 41-44, wherein the ferrule comprises zirconia.

Aspect 46. The method of any of aspects 41-45, wherein the method further comprises:
adhering an optical fiber in the ferrule by providing a chemical cure initiator at an interface between the optical fiber and the ferrule;
providing an adhesive composition at the interface between the optical fiber and the ferrule; and
polymerizing the adhesive composition thereby adhering the optical fiber in the ferrule.

Aspect 47. The method of aspect 46, wherein the chemical cure initiator is coated on the optical fiber.

Aspect 48. The method of aspect 46 or 47, wherein the chemical cure initiator comprises a dihydrogen phosphonate-terminated compound with an amine functionality.

Aspect 49. The method of any of aspects 46-48, wherein the chemical cure initiator comprises a silane-terminated compound with an amine functionality.

Aspect 50. The method of any of aspects 46-49, wherein the adhesive the adhesive composition comprises a monomeric precursor of a methylene malonate polymer.

Aspect 51. A method for bonding an optical fiber within a fiber opening of a ferrule using an adhesive, the method comprising:
applying an adhesion promotor within the opening of the ferrule using a vapor deposition process;
inserting the optical fiber into the opening of the ferrule after application of the adhesion promotor
curing of the adhesive wherein the adhesive is located within the fiber opening radially between the optical fiber and an inner diameter surface of the ferrule and wherein the adhesion promotor promotes adhesion between the ferrule and the optical fiber.

Aspect 52. The method of aspect 51, wherein adhesion promotor also functions as a chemical cure initiator.

Aspect 53. The method of aspect 51 or 52, wherein an inorganic hydrolysable layer is applied to the inner diameter surface of the ferrule, and wherein the adhesion promotor is applied to the inorganic hydrolysable layer.

Aspect 54. The method of any of aspects 51-53, wherein the inorganic hydrolysable layer includes a silicate.

Aspect 55. The method of any of aspects 51-54, wherein the inorganic hydrolysable layer is applied using a vapor deposition process.

Aspect 56. The method of any of aspects 51-55, wherein the ferrule has a composition that includes zirconia.

Aspect 57. The method of any of aspects 51-56, wherein the adhesive comprises a monomeric precursor of a methylene malonate polymer.

Aspect 58. The method of any of aspects 51-57, wherein the adhesion promotor comprises of: an amine functionality, a glycidyl functionality, a thiol functionality, or an oxirane functionality.

Aspect 59. The method of any of aspects 53-58, further comprising using a chemical cure initiator to initiate curing of the adhesive, wherein the chemical cure initiator and adhesion promotor are different compounds.

Aspect 60. The method of aspect 51 or 52, wherein the chemical cure initiator and the adhesion promotor are both 3-amino-triethoxysilane.

Aspect 61. A method of adhering an optical fiber in a ferrule, comprising:
providing an adhesion promotor at an interface between the optical fiber and the ferrule, the adhesion promotor including an amine functionality or a thiol functionality; and
securing the fiber within the fiber opening containing the adhesion promotor via an adhesive composition comprising a monomeric precursor of a methylene malonate polymer when the optical fiber is inserted into the ferrule.

Aspect 62. The method of aspect 61, wherein the adhesion promotor is applied as a coating within a fiber opening of the ferrule prior to insertion of the optical fiber in the fiber opening.

Aspect 63. The method of aspect 61 or 62, wherein the adhesion promotor is applied using a vapor deposition process.

Aspect 64. The method of any of aspects 61-63, wherein an inorganic hydrolysable layer is applied to the inner diameter surface of the ferrule, and wherein the adhesion promotor is applied to the inorganic hydrolysable layer.

Aspect 65. The method of aspect 64, wherein the inorganic hydrolysable layer includes a silicate.

Aspect 66. The method of aspect 64 or 65, wherein the inorganic hydrolysable layer is applied using a vapor deposition process.

Aspect 67. The method of any of aspects 64-66 wherein the ferrule has a composition that includes zirconia.

Aspect 68. The method of any of aspects 64-67, wherein the adhesion promotor comprises of silane-terminated compound with an amine functionality.

Aspect 69. A method of adhering an optical fiber in a ferrule, comprising:
providing an adhesion promotor at an interface between the optical fiber and the ferrule, the adhesion promotor including a glycidyl functionality or an oxirane functionality; and
securing the fiber within the fiber opening containing the adhesion promotor via an adhesive composition comprising a monomeric precursor of a methylene malonate polymer that is polymerized by a chemical initiator when the optical fiber is inserted into the ferrule.

Aspect 70. The method of aspect 69, wherein the chemical cure initiator is applied to the optical fiber prior to insertion of the optical fiber in the ferrule.

Aspect 71. The method of aspect 69 or 70, wherein the adhesion promotor is applied as a coating within a fiber opening of the ferrule prior to insertion of the optical fiber in the fiber opening.

Aspect 72. The method of any of aspects 69-71, wherein the adhesion promotor is applied using a vapor deposition process.

Aspect 73. The method of any of aspects 69-72, wherein an inorganic hydrolysable layer is applied to the inner diameter surface of the ferrule, and wherein the adhesion promotor is applied to the inorganic hydrolysable layer.

Aspect 74. The method of any of aspects 69-73, wherein the inorganic hydrolysable layer includes a silicate.

Aspect 75. The method of any of aspects 69-74, wherein the inorganic hydrolysable layer and the adhesion promotor are applied using a vapor deposition process.

Aspect 76. The method of any of aspects 69-75, wherein the ferrule has a composition that includes zirconia.

Aspect 77. The method of any of aspects 69-76, wherein the chemical cure initiator comprises of silane-terminated compound with an amine functionality.

The various examples described above are provided by way of illustration only and should not be construed to limit the scope of the present disclosure. From the foregoing detailed description, it will be evident that modifications and variations can be made to the ferrule assemblies and methods disclosed herein without departing from the spirit or scope of the disclosure.

What is claimed is:

1. A method of adhering an optical fiber in a ferrule, comprising:

providing a chemical cure initiator at an interface between the optical fiber and the ferrule;
providing an adhesive composition at the interface between the optical fiber and the ferrule, the adhesive composition comprising a monomeric precursor of a methylene malonate polymer and a radical cure initiator of formula (VI):

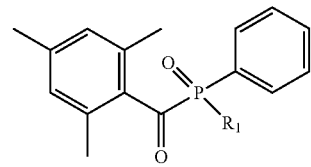

wherein $R_1$ is phenyl or $C_{1-10}$ alkoxy; and
polymerizing the adhesive composition thereby adhering the optical fiber in the ferrule.

2. The method of claim 1, wherein the step of providing a chemical cure initiator at an interface between the optical fiber and the ferrule further comprises:
coating the optical fiber with the chemical cure initiator; and
inserting the coated optical fiber into the fiber opening in the ferrule.

3. The method of claim 1, wherein the chemical cure initiator is selected from the group consisting of: an alkali metal salt, an alkaline earth metal salt, an ammonium salt, an amine salt, a halide, a metal oxide, and mixtures containing such salts or oxides.

4. The method of claim 1, wherein the chemical cure initiator is an amino-silane.

5. The method of claim 1, wherein a polymerization time until fixation of the optical fiber in the ferrule is about 5 to about 30 seconds.

6. The method of claim 1, wherein the radical cure initiator is selected from the group consisting of: trimethylbenzoyl diphenylphosphine oxide (i.e. diphenyl(2,4,6-trimethylbenzoyl) phosphine oxide) and ethoxy-(2,4,6-trimethylbenzoyl) phenyl phosphinate or a combination thereof.

7. A method for bonding an optical fiber within a fiber opening of a ferrule using an adhesive, the method comprising:
initiating curing of a first portion of the adhesive via a chemical cure initiator and initiating curing of a second portion of the adhesive via a radical cure initiator.

8. The method of claim 7, wherein the first portion of adhesive is located within the fiber opening radially between the optical fiber and an inner diameter surface of the ferrule.

9. The method of claim 7, wherein the chemical cure initiator is applied directly to an inner diameter surface of the ferrule.

10. The method of claim 7, wherein the chemical cure initiator is applied using a vapor deposition process.

11. The method of claim 7, wherein the ferrule is an MPO ferrule having a composition that includes PPS.

12. A method of adhering an optical fiber in a ferrule, comprising:
providing an adhesion promotor at an interface between the optical fiber and the ferrule, the adhesion promotor; and
securing the fiber within the fiber opening via an adhesive composition comprising a monomeric precursor of a methylene malonate polymer that is polymerized by a chemical initiator and a radical cure initiator when the optical fiber is inserted into the ferrule.

13. The method of claim 12, wherein the adhesion promotor is applied as a coating within a fiber opening of the ferrule prior to insertion of the optical fiber in the fiber opening.

14. The method of claim 12, wherein the adhesion promotor comprises of a silane-terminated compound including: an amine functionality, a glycidyl functionality, a thiol functionality, or an oxirane functionality.

15. The method of claim 12, wherein the adhesion promotor and the chemical cure initiator are the same compound.

* * * * *